(12) United States Patent
Wattwood

(10) Patent No.: US 11,431,074 B2
(45) Date of Patent: Aug. 30, 2022

(54) ANTENNA ALIGNMENT SYSTEM INCLUDING TECHNICIAN TOOL MOUNT AND RELATED METHODS

(71) Applicant: SUNSIGHT HOLDINGS, LLC, Maitland, FL (US)

(72) Inventor: James A. Wattwood, New Smyrna Beach, FL (US)

(73) Assignee: SUNSIGHT HOLDINGS, LLC, Maitland, FL (US)

( * ) Notice: Subject to any disclaimer, the term of this patent is extended or adjusted under 35 U.S.C. 154(b) by 382 days.

(21) Appl. No.: 16/711,869

(22) Filed: Dec. 12, 2019

(65) Prior Publication Data

US 2021/0184332 A1 Jun. 17, 2021

(51) Int. Cl.
*H01Q 3/02* (2006.01)
*H01Q 1/12* (2006.01)
*H04N 5/225* (2006.01)
*H04B 1/02* (2006.01)
*H01Q 3/00* (2006.01)
*H01Q 1/00* (2006.01)

(52) U.S. Cl.
CPC ........... *H01Q 1/125* (2013.01); *H04N 5/2252* (2013.01); *H01Q 1/00* (2013.01); *H01Q 1/12* (2013.01); *H01Q 3/00* (2013.01); *H04B 1/02* (2013.01)

(58) Field of Classification Search
CPC ............ H01Q 1/125; H01Q 1/00; H01Q 1/12; H01Q 3/00; H04N 5/2252
See application file for complete search history.

(56) References Cited

U.S. PATENT DOCUMENTS

2008/0012750 A1* 1/2008 Austin ................. H01Q 1/1242
342/52
2016/0056525 A1 2/2016 Hansryd et al.

* cited by examiner

*Primary Examiner* — Joseph J Lauture
(74) *Attorney, Agent, or Firm* — Allen, Dyer, Doppelt + Gilchrist, P.A.

(57) ABSTRACT

An antenna alignment system for a directional antenna may include an antenna alignment device to be temporarily mounted to the directional antenna to determine antenna positioning data therefor. The antenna alignment system may also include a technician tool mount associated with the antenna alignment device. The antenna alignment device may also include a technician tool configured to be temporarily mounted to the technician tool mount, and acquire an image looking in a direction outward from the directional antenna.

24 Claims, 5 Drawing Sheets

ANTENNA ALIGNMENT SYSTEM INCLUDING TECHNICIAN TOOL MOUNT AND RELATED METHODS

TECHNICAL FIELD

The present embodiments are directed to the field of antennas, and more particularly, to antenna alignment systems and related methods.

BACKGROUND

It may be desirable to have antennas aligned, not only for operation, but for increased communication efficiency. Present day alignment techniques may be relatively time consuming and involve picking visible landmarks somewhere between two end points or antennas. An educated guess or estimate is made on where the other end point would likely be relative to a given end point. Either or both antennas may be physically adjusted, for example, in azimuth and tilt, in an attempt to align the antennas. This may be particularly difficult as microwave links, for example, can have a length in the 40 mile range, which is beyond a human's visible sight range.

This present day guess and check method involves an increased amount of time for a technician to be on top of a tower moving the antenna back and forth in an attempt to find the other end point.

U.S. Patent Application Publication No. 2016/0056525 to Hansryd et al. is directed to a radio antenna alignment tool. More particularly, Hansryd et al. discloses a sensor unit connected to a first directive antenna. The sensor unit determines a present direction of the first directive antenna. An interface on which sensor information that includes the present direction can be accessed. A guide device receives, on a first input port, the present direction of the first directive antenna from the interface of the sensor unit and indicates to a user at least one of the present direction of the first directive antenna, the location of the second antenna, and a preferred direction of the first directive antenna. The preferred direction of the first directive antenna is determined to maximize a signal quality metric for communication between the first directive antenna and at least one second antenna.

SUMMARY

An antenna alignment system for a directional antenna may include an antenna alignment device to be temporarily mounted to the directional antenna to determine antenna positioning data therefor. The antenna alignment system may also include a technician tool mount associated with the antenna alignment device. The antenna alignment device may also include a technician tool configured to be temporarily mounted to the technician tool mount, and acquire an image looking in a direction outward from the directional antenna.

The technician tool mount may be coupled to the antenna alignment device. The technician tool mount may include a technician tool holder for carrying the technician tool, and a mounting bracket coupling the technician tool holder to the antenna alignment device, for example.

The antenna alignment device may include an antenna alignment device housing, and an antenna alignment device mount coupled between the antenna alignment device housing and the directional antenna. The technician tool mount may include a technician tool holder for carrying the technician tool, and a mounting bracket coupling the technician tool holder to the antenna alignment device mount, for example.

The technician tool may be configured to send the acquired image to the antenna alignment device, for example. The antenna alignment device may be configured to generate a report including the acquired image and the antenna positioning data.

The antenna alignment device may further include a Cloud computing device. The technician tool may be configured to acquire the antenna positioning data, and generate and send a report to the Cloud computing device including the acquired image and the antenna positioning data, for example.

The technician tool may include a technician tool housing, wireless communications circuitry carried by the technician tool housing, and a camera carried by the technician tool housing to acquire the image looking in the outward direction from the directional antenna. The technician tool may include circuitry carried by the technician tool housing cooperating with the wireless communications circuitry to wirelessly acquire the antenna positioning data from the antenna alignment device, for example. The antenna positioning data may include at least one of actual position data, and actual azimuth and tilt data, for example.

A method aspect is directed to a method of antenna alignment of a directional antenna. The method may include mounting an antenna alignment device to the directional antenna to determine antenna positioning data therefor. The method may also include mounting a technician tool to a technician tool mount associated with the antenna alignment device, and operating the technician tool to acquire an image looking in a direction outward from the directional antenna.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
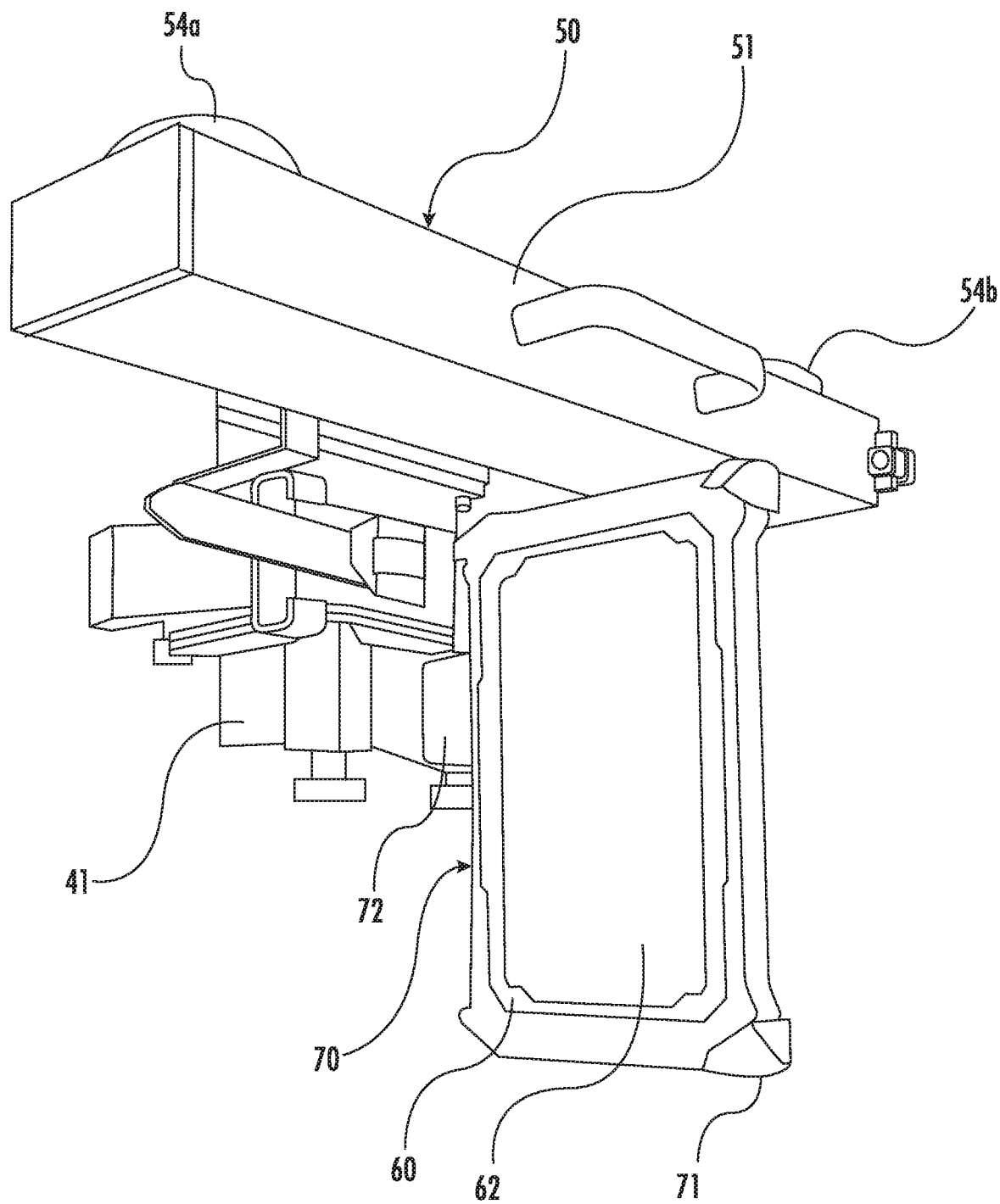
FIG. 1 is a schematic diagram of an antenna alignment system in accordance with an embodiment.
Figure 2:
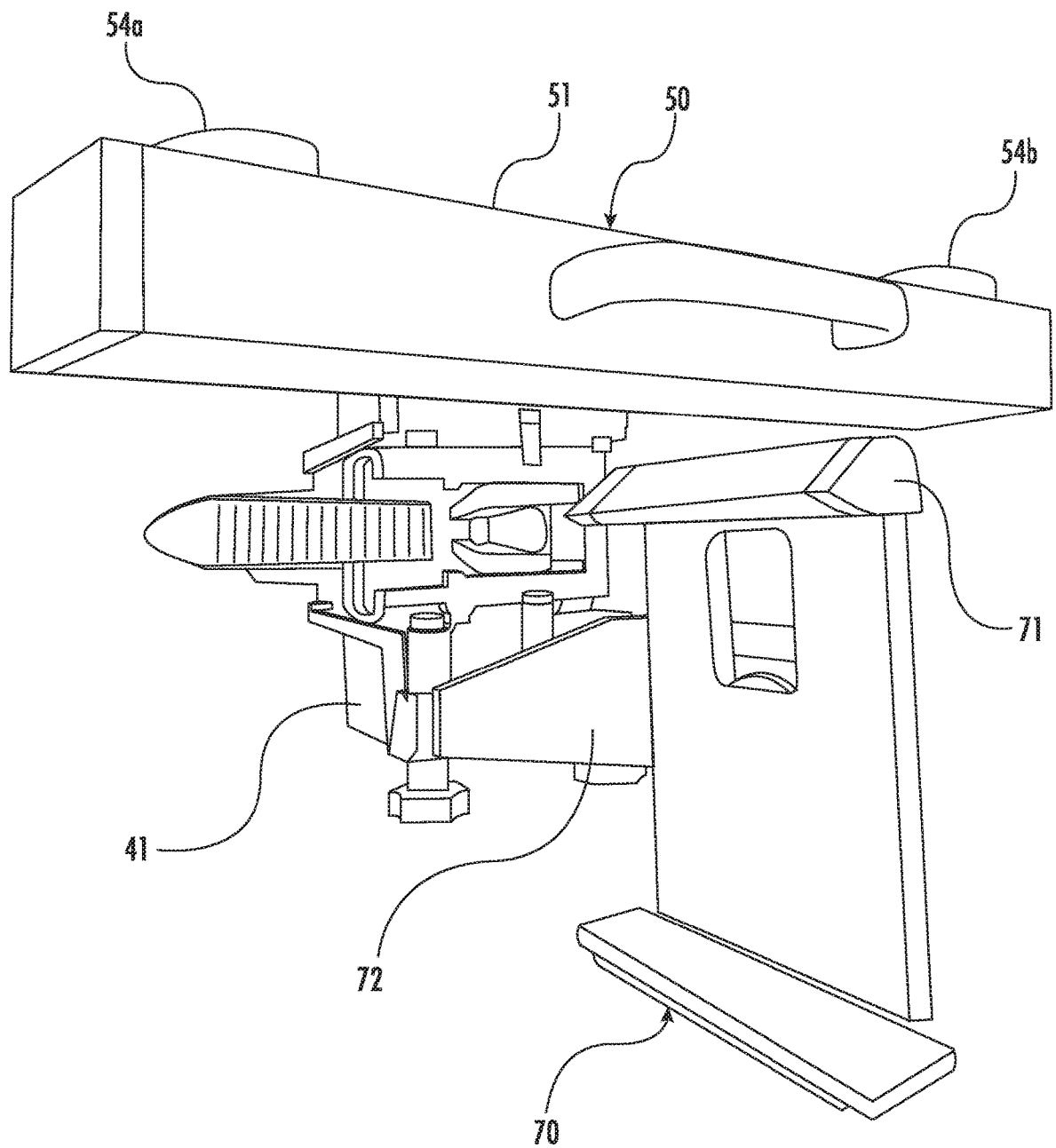
FIG. 2 is another schematic diagram of an antenna alignment system in accordance with an embodiment.
Figure 3:
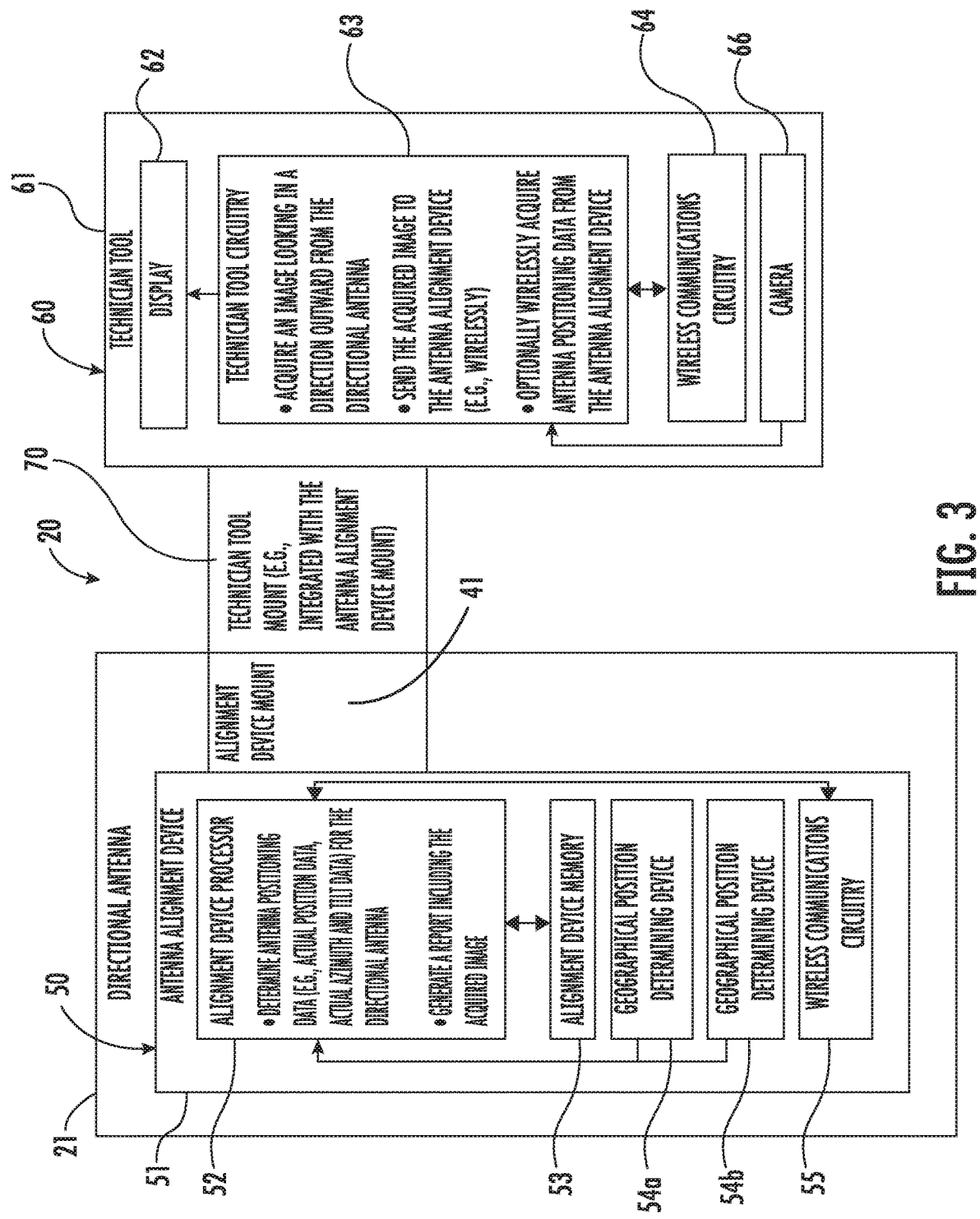
FIG. 3 is a schematic block diagram of an antenna alignment system in accordance with an embodiment.

Referring initially to FIGS. 1-3, an antenna alignment system 20 for a directional antenna 21 illustratively includes an antenna alignment device 50. The directional antenna 21 may define, for example, part of a point-to-point microwave antenna link (e.g., backhaul data from one cellular tower to another), or a cellular antenna. Of course, the directional antenna 21 may be another and/or different type of antenna and may define other and/or additional types of communication links.

The antenna alignment device 50 is to be temporarily mounted to the directional antenna 21 during alignment, for example, to determine antenna positioning data, for example, one or more of actual position data, and actual azimuth and tilt data. Each antenna alignment device 50 may be removably coupled to the directional antenna 21 by way of an antenna alignment device mount 41. The antenna alignment device mount 41 may include an adjustable band or strap, for example, to secure the antenna alignment device 50 to the directional antenna 21. The antenna alignment device mount 41 may also permit adjustment of the antenna alignment device 50 relative to the directional antenna 21, for example, in tilt, azimuth, orientation, etc. Of course the antenna alignment device mount 41 may include other securing mechanisms, for example, elastic or rubber bands, ratcheting mechanisms, or clamping device, and may permit other and/or additional adjustments relative to the directional antenna 21.

Further details of the antenna alignment device 50 will now be described. The antenna alignment device 50 includes an antenna alignment device housing 51 that illustratively has a generally elongate or rectangular shape. Of course, the antenna alignment device housing 51 may be another shape. The antenna alignment device 50 also includes an antenna alignment device processor 52 and an antenna alignment device memory 53 carried by the antenna alignment device housing 51. The antenna alignment device 50 includes geographical position determining devices 54a, 54b carried by the antenna alignment device housing 51 at opposing ends thereof. The geographical position determining devices 54a, 54b may be global positioning system (GPS) receivers, for example, and cooperate with the antenna alignment device processor 52 to determine actual position data for the directional antenna 21 for example, and may also cooperate to sense or measure azimuth (e.g. GPS-based compasses), tilt, roll and height (i.e. elevation, e.g. actual mean sea level (MSL) height), which, as will be appreciated by those skilled in the art, may all be desirable for increased accuracy alignment of the antennas.

There may be any number of geographical position determining devices 54a, 54b (e.g., a single geographical position determining device) and the geographical position determining devices may be carried by the antenna alignment device housing 51 at different locations. Moreover, while geographical position determining devices 54a, 54b are described, for example, as being GPS devices, it should be appreciated that other types of geographical position determining devices may be used, for example, a global navigation satellite system (GLONASS), or BeiDou navigation satellite system (BDS). Furthermore, it should be understood that the geographical position determining devices 54a, 54b may include physical antennas, receivers, either combined or multiple, and any associated circuitry, for example, RF front ends.

The antenna alignment device 50 also includes antenna alignment device wireless communications circuitry 55 coupled to the processor 52. The antenna alignment device wireless communications circuitry 55 may be cellular communication circuitry, for example. Alternatively or additionally, the antenna alignment device wireless communications circuitry 55 may be WiFi, Bluetooth, near-field communication (NFC) or other relatively short range communications circuitry. The antenna alignment device 50 is advantageously battery powered (i.e., a battery is carried by the antenna alignment device housing 51), which may facilitate positioning on the directional antenna 21. Of course, the antenna alignment device 50 may not be powered by a battery and may be powered alternatively or additionally from another power source. An example antenna alignment device 50 is the AAT-15 available from Sunsight Instruments, LLC of Maitland, Fla.

The antenna alignment system 20 also includes a technician tool mount 70 associated with the antenna alignment device 50. The technician tool mount 70 illustratively includes a technician tool holder 71 for carrying a technician tool 60, and a mounting bracket 72 coupling the technician tool holder 71 to the antenna alignment device 50. The technician tool mount 70 is coupled to the antenna alignment device 50, and, more particularly, the mounting bracket 72 of the technician tool mount 70 is coupled to the antenna alignment device mount 41. In other words, the technician tool mount 70 may be integrated with or integrally formed with the antenna alignment device mount 41.

The technician tool 60 is temporarily mounted to the technician tool mount 70. The technician tool 60 acquires, for example, an image looking in a direction outward from the directional antenna 21 as will be described in further detail below.

The technician tool 60 is illustratively in the form of a ruggedized portable tablet computer, and includes a technician tool housing 61 and a display 62 carried by the technician tool housing. Of course, the technician tool 60 may be in the form of another type of electronic device, for example, a laptop computer, a mobile phone, etc. that may be capable of running a portable application. The technician tool 60 may be battery powered. Of course, the technician tool 60 may not be powered by a battery and may be powered alternatively or additionally from another power source. In some embodiments, the technician tool 60 may be carried by the antenna alignment device housing 51. In other words, the antenna alignment device housing 51 may carry the circuitry and/or display of the technician tool 60.

The display 62 may be a touch screen display, for example. The technician tool 60 also includes technician tool circuitry 63, for example, a controller, coupled to the display 62. Technician tool wireless communications circuitry 64 is also carried by the technician tool housing 61 and coupled to the technician tool circuitry 63. The wireless communications circuitry 64 may be cellular, WiFi, Bluetooth, NFC, and/or another type of communications circuitry. The technician tool 60, in some embodiments, may include wired communications circuitry, for example, universal serial bus (USB), Ethernet, etc.

A camera 66 is carried by the technician tool housing 61 and cooperates with the technician tool circuitry 63 to acquire the image looking in the outward direction from the directional antenna 21. The acquired image may be displayed on the display 62. The technician tool 60 may acquire more than one image looking in the outward direction from the directional antenna 21. In some embodiments, the technician tool 60, through cooperation of the circuitry 63 and the wireless communications circuitry 64, for example, wirelessly communicates the acquired image to the antenna alignment device 50. The antenna alignment device 50 may, in turn, generate a report that includes the acquired image data. Other and/or additional data may be included in the report, for example, position data, tilt and roll data, and azimuth data. In some embodiments, the technician tool 60 may acquire, for example, wirelessly, the positioning data from the antenna alignment device 50 for further communication to a Cloud device, for saving to the technician tool 60, and/or for report generation.

Figure 4:
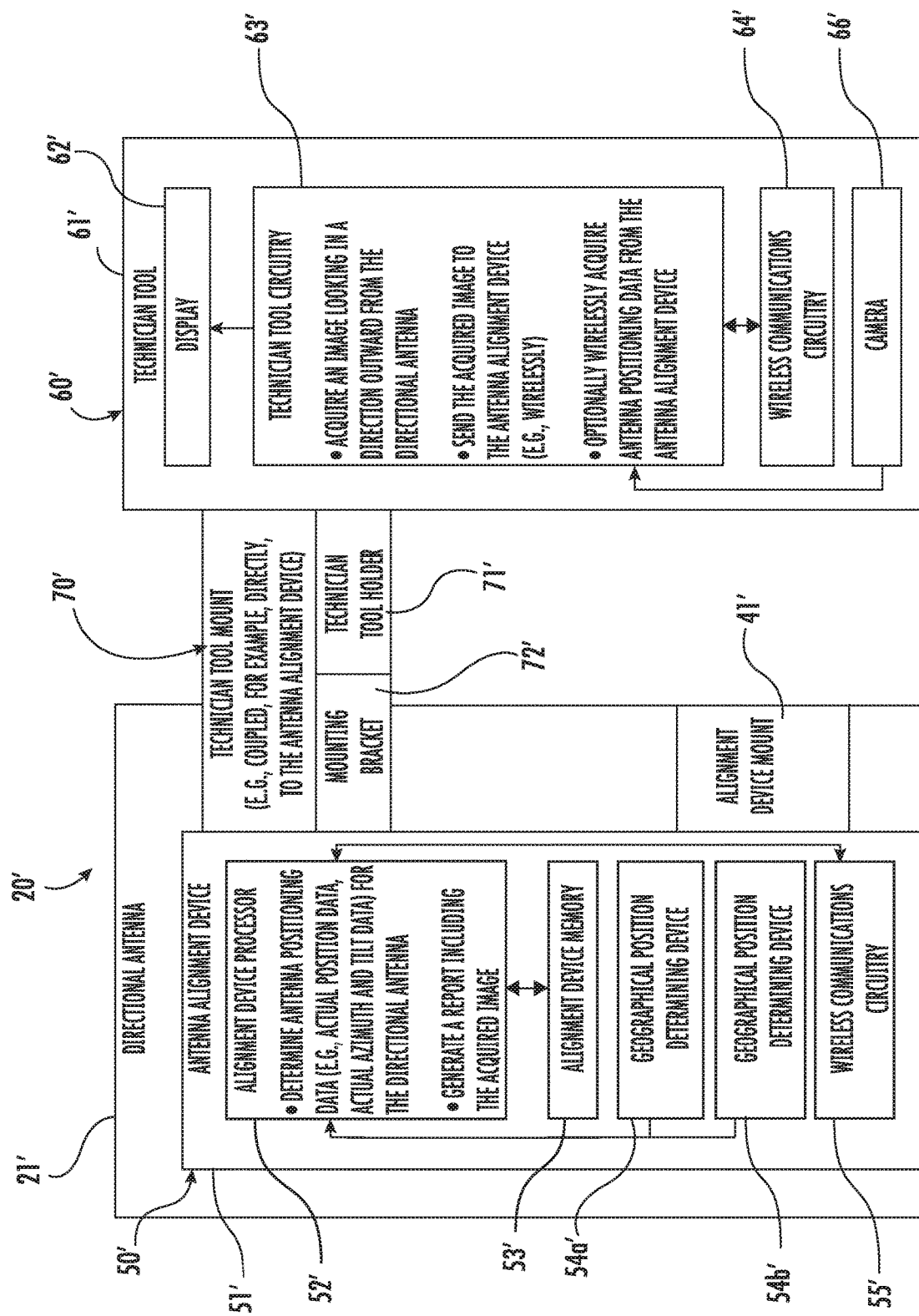
FIG. 4 is a schematic block diagram of an antenna alignment system in accordance with another embodiment.

Referring now to FIG. 4, in another embodiment, the mounting bracket 72' of the technician tool mount 70' is not coupled, for example, directly to the antenna alignment device mount 41'. In other words, the technician tool mount, and, more particularly, the mounting bracket 72' is not integrated with the antenna alignment device mount 41', but rather is coupled to the housing 51' of the antenna alignment device 50' (e.g., directly). Elements illustrated and marked with prime notation, but not specifically described, are similar to those above.

Figure 5:
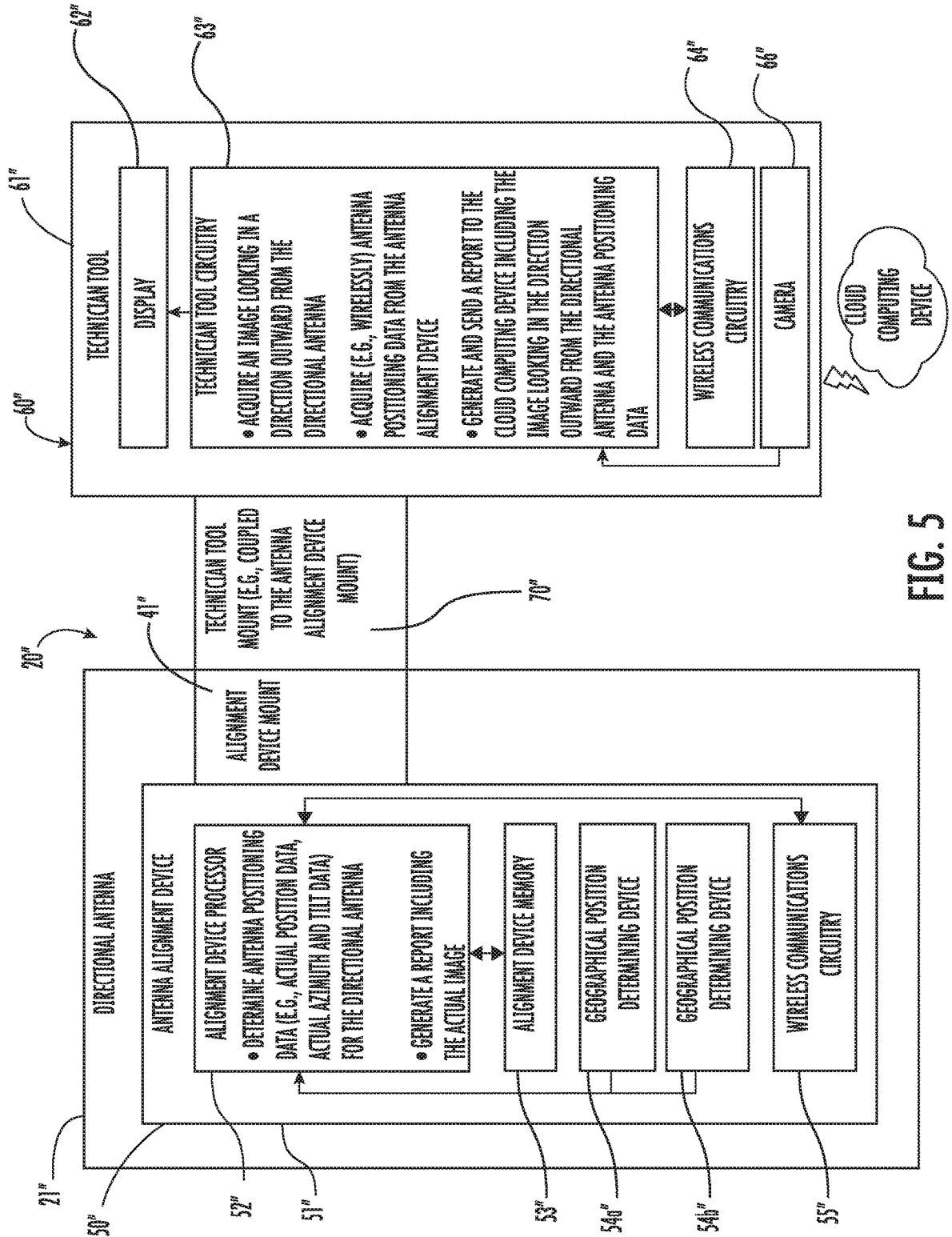
FIG. 5 is a schematic block diagram of an antenna alignment system in accordance with another embodiment.

Referring now to FIG. 5, in another embodiment, the antenna alignment system 20" includes a Cloud computing device 80". The technician tool 60", for example, by way of the wireless communications circuitry 64", acquires the antenna positioning data from the antenna alignment device 50" and generates and sends a report to the Cloud computing device 80". The report may include the image looking in the direction outward from the directional antenna 21", and the antenna positioning data. In some embodiments, the technician tool 60" may not send the report to the Cloud computing device 80". Elements illustrated and marked with double prime notation, but not specifically described, are similar to those above.

As will be appreciated by those skilled in the art, the technician tool mount 70 advantageously permits one or more users to view and document images in the direction outward from the directional antenna 21. In other words, users or technicians can view "what the antenna views" which may be documented as part of report.

A method aspect is directed to a method of antenna alignment of a directional antenna 21. The method may include mounting an antenna alignment device 50 to the directional antenna 21 to determine antenna positioning data therefor. The method may also include mounting a technician tool 60 to a technician tool mount 70 associated with the antenna alignment device 50, and operating the technician tool to acquire an image looking in a direction outward from the directional antenna 21.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An antenna alignment system for a directional antenna comprising:
    an antenna alignment device to be temporarily mounted to the directional antenna to determine antenna positioning data therefor;
    a technician tool mount associated with said antenna alignment device; and
    a technician tool configured to be temporarily mounted to said technician tool mount, and acquire an image looking in a direction outward from the directional antenna along a line-of-sight of the directional antenna.

2. The antenna alignment system of claim 1 wherein said technician tool mount is coupled to said antenna alignment device.

3. The antenna alignment system of claim 2 wherein said technician tool mount comprises a technician tool holder for carrying said technician tool, and a mounting bracket coupling said technician tool holder to said antenna alignment device.

4. The antenna alignment system of claim 1 wherein said antenna alignment device comprises an antenna alignment device housing, and an antenna alignment device mount coupled between the antenna alignment device housing and the directional antenna.

5. The antenna alignment system of claim 4 wherein said technician tool mount comprises a technician tool holder for carrying said technician tool, and a mounting bracket coupling said technician tool holder to said antenna alignment device mount.

6. The antenna alignment system of claim 1 wherein said technician tool is configured to send the acquired image to the antenna alignment device.

7. The antenna alignment system of claim 6 wherein said antenna alignment device is configured to generate a report including the acquired image and the antenna positioning data.

8. The antenna alignment system of claim 1 further comprising a Cloud computing device; and wherein said technician tool is configured to acquire the antenna positioning data, and generate and send a report to the Cloud computing device including the acquired image and the acquired antenna positioning data.

9. The antenna alignment system of claim 1 wherein said technician tool comprises:
    a technician tool housing;
    wireless communications circuitry carried by said technician tool housing; and
    a camera carried by said technician tool housing to acquire the image looking in the outward direction from the directional antenna along the line-of-sight of the directional antenna.

10. The antenna alignment system of claim 9 wherein said technician tool comprises circuitry carried by said technician tool housing cooperating with said wireless communications circuitry to wirelessly acquire the antenna positioning data from said antenna alignment device.

11. The antenna alignment system of claim 1 wherein the antenna positioning data comprises at least one of actual position data, and actual azimuth and tilt data.

12. The antenna alignment system of claim 1 wherein said technician tool comprises a mobile phone.

13. An antenna alignment system for a directional antenna comprising:
    an antenna alignment device to be temporarily mounted to the directional antenna to determine antenna positioning data therefor;
    a technician tool mount coupled to said antenna alignment device; and
    a technician tool configured to be temporarily mounted to said technician tool mount, and acquire an image looking in a direction outward from the directional antenna along a line-of-sight of the directional antenna, said technician tool comprising
    a technician tool housing,
    wireless communications circuitry carried by said technician tool housing, and
    a camera carried by said technician tool housing to acquire the image looking in the outward direction from the directional antenna along the line-of-sight of the directional antenna.

14. The antenna alignment system of claim 13 wherein said technician tool mount comprises a technician tool holder for carrying said technician tool, and a mounting bracket coupling said technician tool holder to said antenna alignment device.

15. The antenna alignment system of claim 13 wherein said antenna alignment device comprises an antenna alignment device housing, and an antenna alignment device mount coupled between the antenna alignment device housing and the directional antenna.

16. The antenna alignment system of claim 15 wherein said technician tool mount comprises a technician tool holder for carrying said technician tool, and a mounting bracket coupling said technician tool holder to said antenna alignment device mount.

17. A method of antenna alignment of a directional antenna comprising:
mounting an antenna alignment device to the directional antenna to determine antenna positioning data therefor;
mounting a technician tool to a technician tool mount associated with the antenna alignment device; and
operating the technician tool to acquire an image looking in a direction outward from the directional antenna along a line-of-sight of the directional antenna.

18. The method of claim 17 further comprising coupling the technician tool mount to the antenna alignment device.

19. The method of claim 18 wherein the technician tool mount comprises a technician tool holder for carrying the technician tool, and a mounting bracket coupling the technician tool holder to the antenna alignment device.

20. The method of claim 17 wherein the antenna alignment device comprises an antenna alignment device housing and an antenna alignment device mount coupled between the antenna alignment device housing and the directional antenna.

21. The method of claim 17 comprising operating the technician tool to send the acquired image to the antenna alignment device.

22. The method of claim 17 wherein the technician tool comprises a technician tool housing, wireless communications circuitry carried by the technician tool housing, and a camera carried by the technician tool housing to acquire the image looking in the outward direction from the directional antenna along the line-of-sight of the directional antenna.

23. The method of claim 17 wherein the antenna positioning data comprises at least one of actual position data, and actual azimuth and tilt data.

24. The method of claim 17 wherein the technician tool comprises a mobile phone.

* * * * *